Dec. 19, 1961 S. L. MOREL 3,013,515
HYDROSKI ASSEMBLY
Filed April 14, 1960

STATIC　　STARTING　　RISING　　CRUISING

Inventor
STANLEY L. MOREL

By R. A. Tompkins
Attorney 3,013,515
HYDROSKI ASSEMBLY
Stanley Lawrence Morel, 935 SW. 42nd Ave.,
Miami 44, Fla.
Filed Apr. 14, 1960, Ser. No. 22,373
6 Claims. (Cl. 114—66.5)
(Granted under Title 35, U.S. Code (1952), sec. 266)

The invention described herein may be manufactured and used by or for the Government of the United States of America for governmental purposes without the payment of any royalties thereon or therefore.

The present invention relates to a hydroski assembly for a vehicle and more particularly to a hydroski assembly having a hydrofoil for planing the surface of the water prior to the planing of the hydroski, a pipe shaped hydroski open on both ends and having a slant cut at the forward end thereof, propulsion means developing a downward thrust component and a particular supporting structure allowing inclination of the hydroskis when cruising and allowing retraction of the entire hydroski assembly.

One problem in the field of hydroski devices has been the lack of maneuverability and a strong tendency of the supporting vehicle to overturn upon making a course change. Another problem has been to provide a hydroski device which would allow the supported vehicle to enter shallow water when the hydroski is not planing. A still further problem has been keeping a prop in the water for motive force as the hydroskis approach a planing position. The present invention overcomes the problem of maneuverability by introducing a downward thrust component from the propulsion source and has overcome the problem of entering shallow water by providing a hydroski device which is retractable, folding up when power is reduced. The problem in the prior art of keeping the prop in the water has been overcome in the present invention by mounting the motive plant on the hydroskis rather than on the vehicle.

An object of the present invention is the provision of a hydroski assembly for a vehicle which will allow the vehicle to enter shallow water when the hydroski assembly is not planing.

Another object is to provide a hydroski assembly which will render improved maneuverability and which will lessen overturning tendencies of a supported vehicle.

A further object of the invention is to provide a hydroski which will render an improved lifting force on the supported vehicle.

A further object is to provide a hydroski assembly which is simple to construct and easily adaptable to any existing vehicle.

A still further object of the invention is to provide a hydroski assembly which is more economical to operate.

Other objects and many of the attendant advantages of this invention will be readily appreciated as the same become better understood by reference to the following detailed description when considered in connection with the accompanying drawings wherein.

Figure 1:
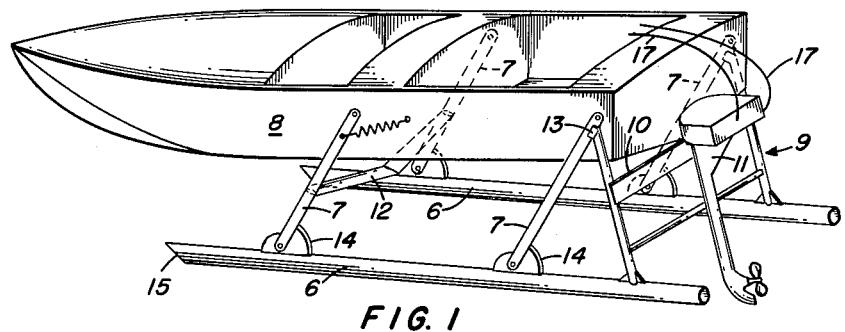
FIG. 1 shows a diagrammatic view of the invention at cruising speed.
Figure 2:
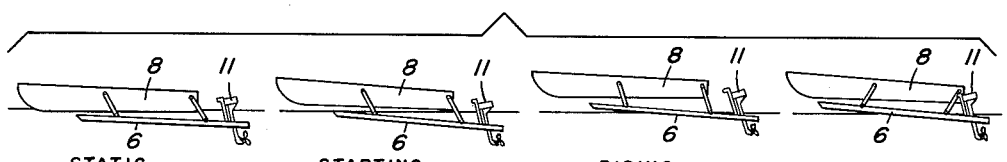
FIG. 2 shows the relative positions of the hydroski assembly from a static condition to cruising speed.
Figure 3:
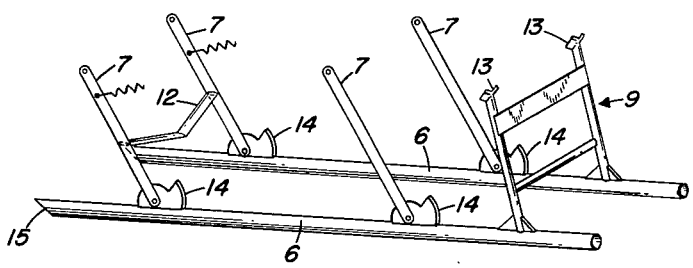
FIG. 3 shows a diagrammatic view of the hydroski assembly in a partially retracted position.
Figure 4:
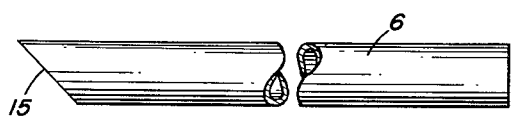
FIG. 4 shows an embodiment of a hydroski.
Figure 5:
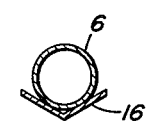
FIG. 5 illustrates another embodiment of a hydroski.

Referring now to the drawings, wherein like reference characters designate like or corresponding parts throughout the several views, there is shown in FIG. 1 hydroskis 6 pivotally attached to struts 7, the struts in turn being pivotally attached to the structure of any vehicle such as boat 8. The forward pair of struts are of a shorter length than the after pair of struts to maintain boat 8 in a horizontal riding position when cruising and thereby reduce air resistance. A support 9 is fixedly mounted on each hydroski 6 on a forward incline to the longitudinal axis of each hydroski 6 and has a crossmember 10 adapted to receive an outboard motor 11. Each hydroski 6 has stops 14 at a predetermined angle to the longitudinal axis of each ski which will stop the forward movement of the skis 6 in relation to the boat 8. When the skis 6 are stopped in their forward movement they are at cruising speed as shown in FIG. 2. It is to be noted that also at this speed ears 13 of support 9 engage after struts 7 thereby giving rigidity to the entire structure. While for illustrative purposes support 9 is adapted to receive an outboard motor it may be modified to receive or mount any propulsion means so long as a part of the thrust component of the propulsion means is directed downward. Fixedly mounted on each of the forward struts 7 is a hydrofoil 12 for aiding in lift of hydroskis 6 to their planing position and for strengthening the rigidity of the forward struts. Hydrofoil 12 is congruous with the hull of boat 8 so that when the entire hydroski assembly is in its retracted position hydrofoil 12 mates with the hull of the boat. When hydroskis 6 are in a planing position hydrofoil 12 is no longer in contact with the water. Hydroskis 6 are tubes open at both ends, one of such hydroskis being shown in FIG. 4 having at its forward end a slant cut 15 from its top to its bottom directed towards its after end. Another embodiment of hydroski 6 is shown in FIG. 5 having an angle iron 16 mounted on the bottom side and along the length of each hydroski. While it is preferred to employ hydroskis of tube shape it is to be understood that the invention is operative even though conventional hydroskis are employed. Control of the outboard motor 11 may be effected by any suitable means such as flex cables 17. Further, a spray shield (not shown) may be mounted on hydroskis 6, struts 7, and/or support 9 to protect motor 11 from spray.

The operation of the device is best explained by referring to FIG. 2 wherein the static position shows the device with no motive power. Upon applying motive power the device passes through starting, rising and cruising speeds. During starting several forces are acting to raise the hydroskis 6 to a planing position, namely, the lifting forces acting on both the bottom of hydroski 6 and on the top surface of the inside of said hydroski and the force acting on hydrofoil 12. The lifting force on the top surface of the inside of the hydroski is caused by the upward force of the water traveling through the tube. As the hydroskis are generally on an incline to the surface of the water while rising through the water the slant cut 15 aids in directing water through the hydroskis thereby giving lift. The forward motion of hydroskis 6 in relation to the boat 8 is effected by the forward thrust of outboard motor 11, such movement being assisted by the resistive forces of the water against the hull structure and by resistance of the air against the aforesaid structure. Furthermore, the effect of the viscosity of the water during the initial extension provides a compound lift against the hull in relationship to the lesser effect of air once the transition stage is effected. Moreover, it is for this purpose that the struts are mounted, as shown, so as to provide an eccentric arc in which the velocity imposed by the water action is transferred to the lesser reactive forces of air. This is partially due to the inertia of the air being overcome by the denser water, up to the point of arc when minimal effort, which is afforded by the air, completes the arm of extension back to the offset or limit stops. The offset, being a point beyond that of equilibrium in which travel is continued, creates static condition of both weight, coupled with opposing thrust (skis forward vs. boat aft) so as to maintain a mechanical positioning effected by limit stops at both extremes of the struts such as at the position required for cruising on the plant surface, and also applied to the reverse application for the same purpose when the power (thrust) is cut off. Whereupon the momentum of the boat above, against the lesser air density, as opposed to the greater resistance of the water, against the skid below, effects the transition from airborne (relative to the boat hull) to water-borne by the minute catapult effect over the offset. The forward incline of support 9 in relation to the longitudinal axis of each hydroski causes outboard motor 11 when mounted and at cruising speed to produce a downward thrust component. This downward thrust component prevents overturning of boat 8 upon turning by deepening the inturn hydroski a sa pivot thereby giving a banked turn. Upon reducing motive power the hydroski assembly retracts due to the drag of the water on the hydroskis initially and later substantially on the entire hydroski assembly. Retraction may be aided by a spring or bungee in addition to the drag. It is easily visualized that the hydroski assembly described above may be adapted to any type of vehicle such as aircraft, rescue craft and large vessels including submarines.

Obviously many modifications and variations of the present invention are possible in the light of the above teachinngs. It is therefore to be understood that withinn the scope of the appended claims the invention may be practiced otherwise than as specifically described.

What is claimed is:

1. In a hydroski assembly comprising a hull, a pair of tubular hydroskis, propulsion means carried by said hydroskis, means mounting said propulsion means on said hydroskis, forward and aft supporting means pivotally connecting said hydroskis to said hull and movable with respect to said hull so that said hydroskis are actuated from an initial position to a forward cruising position in response to hydro, aerodynamic and thrust forces applied to said hull, and means carried by the hydroskis engageable by said supporting means for stopping the hydroskis after reaching said cruising position thereby to maintain the hull in an airborne condition.

2. In a hydroski assembly comprising a hull, a pair of elongated tubular hydroskis, propulsion means carried by said hydroskis, means for mounting said propulsion means on said hydrdoskis, a forwardly disposed pair and an after disposed pair of struts pivotally connecting said hydroskis to the hull for supporting the hull on the hydroskis, said struts being movable with respect to said hull so that said hydroskis are movable from an initial position to a forward cruising position with the hull airborne in response to hydro, aerodynamic and thrust forces applied to said hull, and means carried by said pair of hydroskis and cooperating with said struts for stopping forward movements of said hydroskis as the skis reach said cruising position thereby to maintain the hull in said airborne condition.

3. In a hydroski assembly comprising a hull, a pair of mutually spaced tubular hydroskis pivotally connected to said hull, a forward pair and an after pair of struts pivotally connecting said hydroskis to the hull for supporting the hull, said struts being movable forwardly and rearwardly with respect thereto as the hull is subjected to several variable forces so that the hydroskis may be moved forwardly to a cruising position and rearwardly to an initial position depending upon the intensity of said forces, a motor mounted on said hydroskis, means including a support fixed at one end to the hydroskis and at the other end thereof adapted to engage the after pair of struts for mounting said motor on said hydroskis, stop means carried by said hydroskis and engageable by said struts for maintaining the hydroskis in a cruising position and the hull in an airborne position, and a hydrofoil mounted on and disposed between said forward pair of struts to assist in the movement of said hydroski to said cruising position.

4. In a hydroski assembly according to claim 3 wherein the tubular hydroskis are inclined downwardly and rearwardly at the forward ends thereof to further assist in the movement of said hydroskis to the cruising position.

5. In a hydroski assembly according to claim 3 wherein said support positions the motor so as to cause a downward thrust component and said struts are of such lengths that the longitudinal axis of said hull is substantially parallel to a horizontal plane when the hydroskis are in said cruising position and said stop means are in engagement with said struts.

6. In a hydroski assembly according to claim 3, including biasing means attached to said forward pair of struts and to the hull to move said hydroskis from a cruising position to an initial position.

References Cited in the file of this patent

UNITED STATES PATENTS

| | | |
|---|---|---|
| 1,169,947 | Forse | Feb. 1, 1916 |
| 1,296,876 | Tarbox | Mar. 11, 1919 |
| 1,410,872 | Baldwin | Mar. 28, 1922 |
| 1,410,875 | Baldwin et al. | Mar. 28, 1922 |
| 1,794,474 | Miller | Mar. 3, 1931 |
| 2,063,005 | Payne | Dec. 1, 1936 |
| 2,214,945 | Wiehmiller | Sept. 17, 1940 |
| 2,369,129 | Bell et al. | Feb. 13, 1945 |
| 2,749,870 | Vavra | June 12, 1956 |
| 2,886,462 | Jagiel | May 12, 1959 |

FOREIGN PATENTS

| | | |
|---|---|---|
| 42,431 | Switzerland | Dec. 11, 1907 |
| 518,878 | Great Britain | Mar. 11, 1940 |
| 538,041 | Belgium | May 31, 1955 |